No. 887,449. PATENTED MAY 12, 1908.
B. D. WIGHT.
LACE MEASURING AND WINDING MACHINE.
APPLICATION FILED FEB. 23, 1907.
2 SHEETS—SHEET 1.
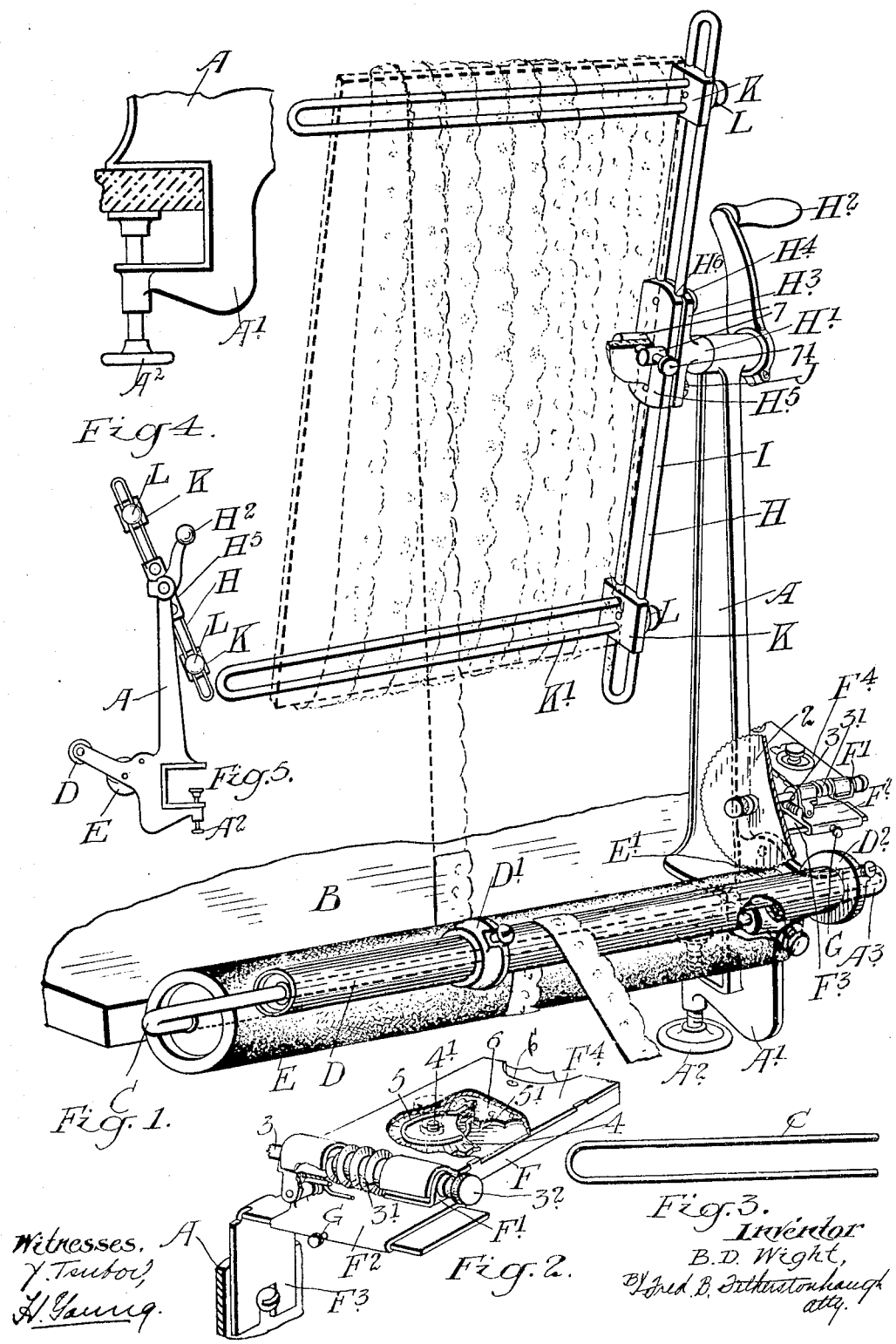

No. 887,449. PATENTED MAY 12, 1908.
B. D. WIGHT.
LACE MEASURING AND WINDING MACHINE.
APPLICATION FILED FEB. 23, 1907.

2 SHEETS—SHEET 2.

Witnesses
H. Ya——
George R. Meldrum

Inventor
B. D. Wight
by Fred B. Fetterbaugh
Atty.

UNITED STATES PATENT OFFICE.

BRINTON DOUGALL WIGHT, OF TORONTO, ONTARIO, CANADA.

LACE MEASURING AND WINDING MACHINE.

No. 887,449.  Specification of Letters Patent.  Patented May 12, 1908.

Application filed February 23, 1907. Serial No. 358,983.

*To all whom it may concern:*

Be it known that I, BRINTON DOUGALL WIGHT, of the city of Toronto, in the county of York, in the Province of Ontario, Canada, have invented certain new and useful Improvements in Lace Measuring and Winding Machines, of which the following is the specification.

My invention relates to improvements in lace measuring and winding machines, and the object of the invention is to devise a simple compact and accurate device of this class, which may be attached to the side of a table or counter and the lace preferably unwound, and then rewound and measured simultaneously without any liability of soiling or error in measurement.

Further objects are to arrange the registering attachment, so that the lace may be measured as it is unwound, if desired, and to connect the primary and secondary registering wheels that they may be set to zero independent of each other.

To these ends I have constructed my machine with the main standard, rolls carried thereby, a measuring disk designed to come in contact with the periphery of the roll at one end and secured on a spindle supported in suitable bearings, and provided with a worm, a registering device rotated by the worm, and a lace reel journaled on the top of the standard, the parts being constructed and arranged in detail as hereinafter more particularly explained.

Figure 6:
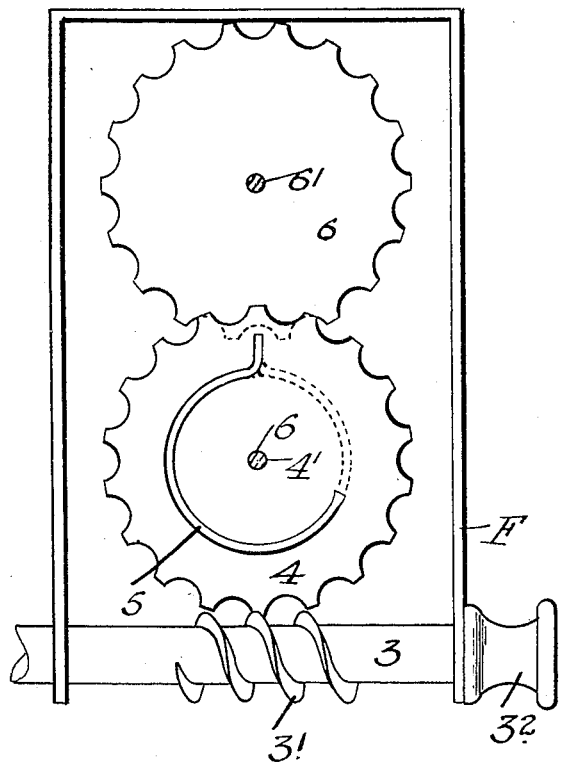
Figure 7:
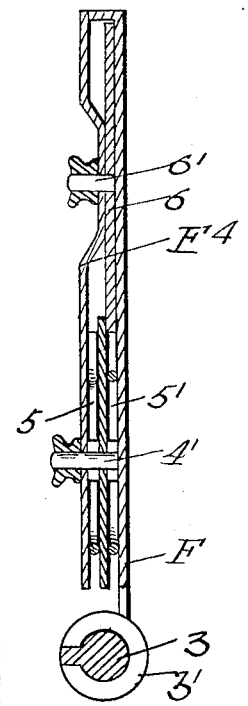

Figure 1, is a perspective view showing my improved lace measuring machine, parts being broken away to exhibit the construction. Fig. 2, is a detail of the registering mechanism. Fig. 3, is a diminutive view as compared with Fig. 1, showing the U-shaped rod on which the measuring roller and guiding roller are journaled. Fig. 4, is a side view showing the manner of attaching the standard to the counter. Fig. 5 is a side elevation. Fig. 6 is a horizontal section and Fig. 7 is a vertical section through the register casing.

In the drawings like letters of reference indicate corresponding parts in each figure.

A is the standard of the machine, which is provided with a lower jaw A' through the inner end of which extends the set screw A² by which the standard is secured to the counter B. The standard A has attached to or forming part of it the bracket A³ in which is fitted the ends of the U or loop-shaped bar C, which carries the guiding roller D and the measuring roller E.

The guiding roller D is provided with adjustable collars D' and D², whereby the lace may be guided backwards and forwards on to any predetermined width of reel.

Both the guiding roll D as well as the measuring roll E have ends through which extend the two portions of the U-shaped rod C, and such rollers are consequently journaled on the two portions of such rod.

The end of the roller E is provided with an annular rubber band E'.

2 is the measuring disk which is preferably provided with a knurled periphery, and meshes with the annular band E'. The disk 2 is secured on the end of the spindle 3, which is journaled in suitable bearings F', in the register casing F, which has an outwardly extending portion F² forming a guide-way by which it is supported on the top of the bracket F³ secured on the lower end of the standard A as indicated.

The set screw G is provided in order to secure the casing in any desired position on the bracket F³.

The spindle 3 is provided with a worm 3' and the end knobs 3², whereby it may be turned by hand. The worm 3' meshes with the toothed unit registering wheel 4, the spindle 4' of which is journaled in suitable bearings in the casing F and cover plate F⁴.

5 5' are spring fingers secured on each side of the registering disk 4, and the lowermost of which is set one way and the uppermost in the opposite way.

It will be noted that the fingers 5 5' are formed mostly annular in form, one end of the annulus being secured to the disk 4 and the other end being free and lying close to the disk. The free end of the lowermost finger engages with one of the teeth of the tens registering wheel 6, the spindle 6' of which is journaled in bearings in the casing F and the cover plate F⁴. The disk 4 over-rides or lies on top of the edge of the disk 6, so that either spring finger 5 or 5', which is below the disk 4 for the time being engages with one of the notches of the disk 6 upon each rotation of the disk 4.

H is the reel, which comprises a central spindle H' journaled in bearings at the top of the standard A and provided with a crank handle H², a bracket H³ secured on the inner end of the spindle and provided with grooves H⁴, a clamping plate H⁵ having corresponding grooves H⁶ located opposite the grooves H⁴ in the bracket H³ and arms I held in the grooves between the bracket and the plate by the clamping screws J.

The arms I are wire arms somewhat in straight loop form, thereby serving as guideways for the plates K, which carry the bars K′, which are straight loop-bars as indicated and which are desired to be inserted in between the lace and the board upon which it is wound, so as to carry the lace board. The plates K are adjustable radially in the loop guides being held in any desired position by the clamping screws L.

In order to hold the cloth board in position I provide two laterally extending projections 7 on the plate H⁵, a set screw 7′, which extends through one of the projections and is designed to be brought against the cloth board as indicated in Fig. 1, portion only of the cloth board being shown for the purpose of illustration.

Having now described the principal parts involved in my invention I shall briefly describe its operation and utility.

The lace board is placed on the loop bars K′ by inserting such bars between the lace and the board. The crank handle of the reel is then turned and the lace unwound off into a basket or other receptacle. To measure the lace the end of the lace is drawn over the roller D and under the roller E, and then the end attached to the lace board. The reel is now turned and as the lace is drawn through, the wheel 2 engaging with the rubber annular band E′ on the end of the roller is caused to rotate, and as such disk is preferably a quarter of a yard in circumference the lace as it is being wound on the reel will be measured accurately on registering mechanism deriving movement from the worm 3′.

If desired the lace may be measured as it is being unwound in which case the reverse of the above operation is necessary. In this case the registering wheel 4 would be reversed or turned up side down in order to have the now top finger as the bottom finger, so that such wheel in turning in the opposite direction would give the required movement to the ultimate registering disk 6.

Such a lace measuring device as I have described is simple, compact and cheaply made to effect the end desired.

What I claim as my invention is:

1. In a lace measuring and winding machine, the combination with a standard having means for securing it to the counter and a bracket extending outwardly therefrom at the bottom, of a U- or loop-shaped rod having the end secured in the bracket, a measuring roller journaled on one portion of the rod, and a guiding roller journaled on the other portion parallel with the measuring roller, and suitable adjustable collars on the guiding roller as and for the purpose specified.

2. In a lace measuring and winding machine, the combination with a standard having means for securing it to the counter and a bracket extending outwardly therefrom at the bottom, of a U- or loop-shaped rod having the end secured in the bracket, a measuring roller journaled on one portion of the rod, a guiding roller journaled on the other portion parallel with the measuring roller, adjustable collars on the guiding rollers, and a reel journaled in the top of the standard and designed to hold the lace board, and means for turning the reel, such as a crank handle as and for the purpose specified.

3. In a device of the class described, the combination with the measuring wheel and spindle thereof journaled in suitable bearings and provided with a worm, of a measuring disk having two spring-shaped fingers, one located at the top and the other at the bottom and being substantially circular and reversely set as to the fastening of the ends of the finger and the ultimate registering disk with which one of the aforesaid fingers is designed to co-act as and for the purpose specified.

4. The combination with the standard, of the reel spindle having means for turning the same and provided with a grooved bracket at one end, wire loop guides fitting in the grooves of the bracket, a grooved plate and a clamping screw for holding it in position to hold the ends of the loop guides, and bars adjustable on the loop guides as and for the purpose specified.

5. The combination with the standard, of the reel spindle having means for turning the same and provided with a grooved bracket at one end, wire loop guides fitting in the grooves of the bracket, a grooved plate, and a clamping screw for holding it in position to hold the ends of the loop guides, and grooved plates having loop bars extending laterally therefrom, and a clamping screw for adjustably holding the plates on the loop guides as and for the purpose specified.

6. The combination with the reel having the radially arranged bars and a central plate, of projections extending laterally from the plate, a set screw extending through one of the projections and designed to abut the cloth board and hold it in position as and for the purpose specified.

BRINTON DOUGALL WIGHT.

Witnesses:
B. BOYD,
A. CRIGHTON.